United States Patent
Tanaka

(10) Patent No.: US 10,104,259 B2
(45) Date of Patent: Oct. 16, 2018

(54) SETTING SUPPORT APPARATUS AND SETTING SUPPORT METHOD

(71) Applicants: KABUSHIKI KAISHA TOSHIBA, Tokyo (JP); TOSHIBA TEC KABUSHIKI KAISHA, Tokyo (JP)

(72) Inventor: Hiroyo Tanaka, Tokyo (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/669,492

(22) Filed: Aug. 4, 2017

(65) Prior Publication Data

US 2018/0234571 A1    Aug. 16, 2018

(30) Foreign Application Priority Data

Feb. 16, 2017  (JP) ................. 2017-026702

(51) Int. Cl.
*G06K 15/00* (2006.01)
*H04N 1/00* (2006.01)

(52) U.S. Cl.
CPC ..... *H04N 1/00896* (2013.01); *H04N 1/00411* (2013.01); *H04N 2201/0094* (2013.01)

(58) Field of Classification Search
CPC ........... H04N 1/00896; H04N 1/00411; H04N 2201/0094
USPC ....................................... 358/1.14
See application file for complete search history.

(56) References Cited

U.S. PATENT DOCUMENTS

| 9,185,241 | B2 | 11/2015 | Valobra et al. |
| 2007/0223028 | A1 | 9/2007 | Boyes et al. |
| 2011/0010571 | A1 | 1/2011 | Dance et al. |
| 2012/0327487 | A1* | 12/2012 | Kamisuwa ........... B41M 7/0009 358/527 |
| 2014/0211256 | A1* | 7/2014 | Hosotsubo ............ G06F 3/1219 358/1.15 |
| 2015/0098105 | A1* | 4/2015 | Yamaki .............. H04N 1/00344 358/1.14 |

FOREIGN PATENT DOCUMENTS

JP      2013-011889 A    1/2013

OTHER PUBLICATIONS

Search Report dated Jun. 14, 2018 in corresponding European application No. 18155307.4, 10 pages.

* cited by examiner

*Primary Examiner* — Neil R McLean
(74) *Attorney, Agent, or Firm* — Foley & Lardner LLP

(57) ABSTRACT

A setting support apparatus calculates a degree of a job executed until a standby time from a value obtained by totalizing number of times of jobs executed by a job execution apparatus at each standby time after a previous job is terminated. The setting support apparatus receives input of a transition time to a power saving mode set in the job execution apparatus. The setting support apparatus outputs information relating to the degree of the job executed by the job execution apparatus until the transition time of which input is received based on a calculation result.

11 Claims, 9 Drawing Sheets

| STANDBY TIME | NUMBER OF JOBS | CUMULATIVE RATIO |
|---|---|---|
| 0 MINUTES | 1700 | 34% |
| 1 MINUTES | 900 | 52% |
| 2 MINUTES | 780 | 68% |
| 3 MINUTES | 540 | 79% |
| 4 MINUTES | 300 | 85% |
| 5 MINUTES | 160 | 88% |
| 6 MINUTES | 160 | 92% |
| 7 MINUTES | 100 | 94% |
| 8 MINUTES | 20 | 94% |
| 9 MINUTES | 60 | 95% |
| 10 MINUTES | 40 | 96% |
| 12 MINUTES | 20 | 96% |
| 14 MINUTES | 20 | 97% |
| 16 MINUTES | 20 | 97% |
| 18 MINUTES | 40 | 98% |
| 20 MINUTES | 20 | 98% |
| 25 MINUTES | 20 | 99% |
| 30 MINUTES | 20 | 99% |
| 35 MINUTES | 10 | 99% |
| 40 MINUTES | 10 | 100% |
| 45 MINUTES | 20 | 100% |
| 50 MINUTES | 0 | 100% |
| 60 MINUTES | 0 | 100% |
| 60 MINUTES OR MORE | 0 | 100% |
| TOTAL | 4960 | |

| | POWER SAVING TRANSITION TIME | SLEEP TRANSITION TIME | CONSUMED POWER AMOUNT |
|---|---|---|---|
| CURRENT | T11 | T12 | W1 |
| CHANGE | T21 | T22 | W2 |
| | | REDUCED POWER AMOUNT | $\triangle W$ |

SETTING SUPPORT APPARATUS AND SETTING SUPPORT METHOD

CROSS-REFERENCE TO RELATED APPLICATION

This application is based upon and claims the benefit of priority from Japanese Patent Application No. 2017-026702, filed Feb. 16, 2017, the entire contents of which are incorporated herein by reference.

FIELD

Embodiments described herein relate generally to a setting support apparatus for supporting setting of a transition time to a power saving mode in a job execution apparatus and a setting support method for enabling a computer to function as the setting support apparatus.

BACKGROUND

An image forming apparatus such as a printer, a facsimile, a multifunction peripheral (MFP) is a so-called job execution apparatus for executing a job each time a job (image forming job) is input. In a case in which no job is input even after a preset transition time elapses, this type of the job execution apparatus generally switches to a power saving mode in which consumed power is less than that in a normal state. By switching to the power saving mode, it is possible to reduce the consumed power. However, at the time of the power saving mode, time (warm-up time) is required until the job can be executed. Thus, if the transition time is not set in consideration of an execution frequency of the jobs, convenience is impaired. However, the fact is that the transition time is not set in consideration of the execution frequency of the jobs in the job execution apparatus.

DESCRIPTION OF THE DRAWINGS

FIG. 2 is a pattern diagram illustrating an example of a job management table;

FIG. 3 is a pattern diagram illustrating an example of a comparison table;

DETAILED DESCRIPTION

In accordance with an embodiment, a setting support apparatus comprises an arithmetic module, an input reception module, and an output module. The arithmetic module calculates a degree of a job executed until a standby time based on a value obtained by totaling a number of times jobs executed by a job execution apparatus at each standby time after a previous job are terminated. The input reception module receives input of a transition time to a power saving mode set in the job execution apparatus. The output module outputs information relating to the degree of the job executed by the job execution apparatus until the transition time of which input is received by the input reception module based on a calculation result by the arithmetic module.

Hereinafter, an embodiment of a setting support apparatus for supporting setting of a transition time to a power saving mode in a job execution apparatus is described with reference to the accompanying drawings.

In the embodiment described later, a multifunction peripheral (MFP) is applied as the job execution apparatus. Incidentally, the job execution apparatus is not limited to the MFP. An image forming apparatus such as a printer, a facsimile or the like can also be applied as the job execution apparatus. An information processing apparatus which switches to the power saving mode if there is no operation input in a certain time such as a personal computer can also be the job execution apparatus.

First Embodiment

Figure 1:
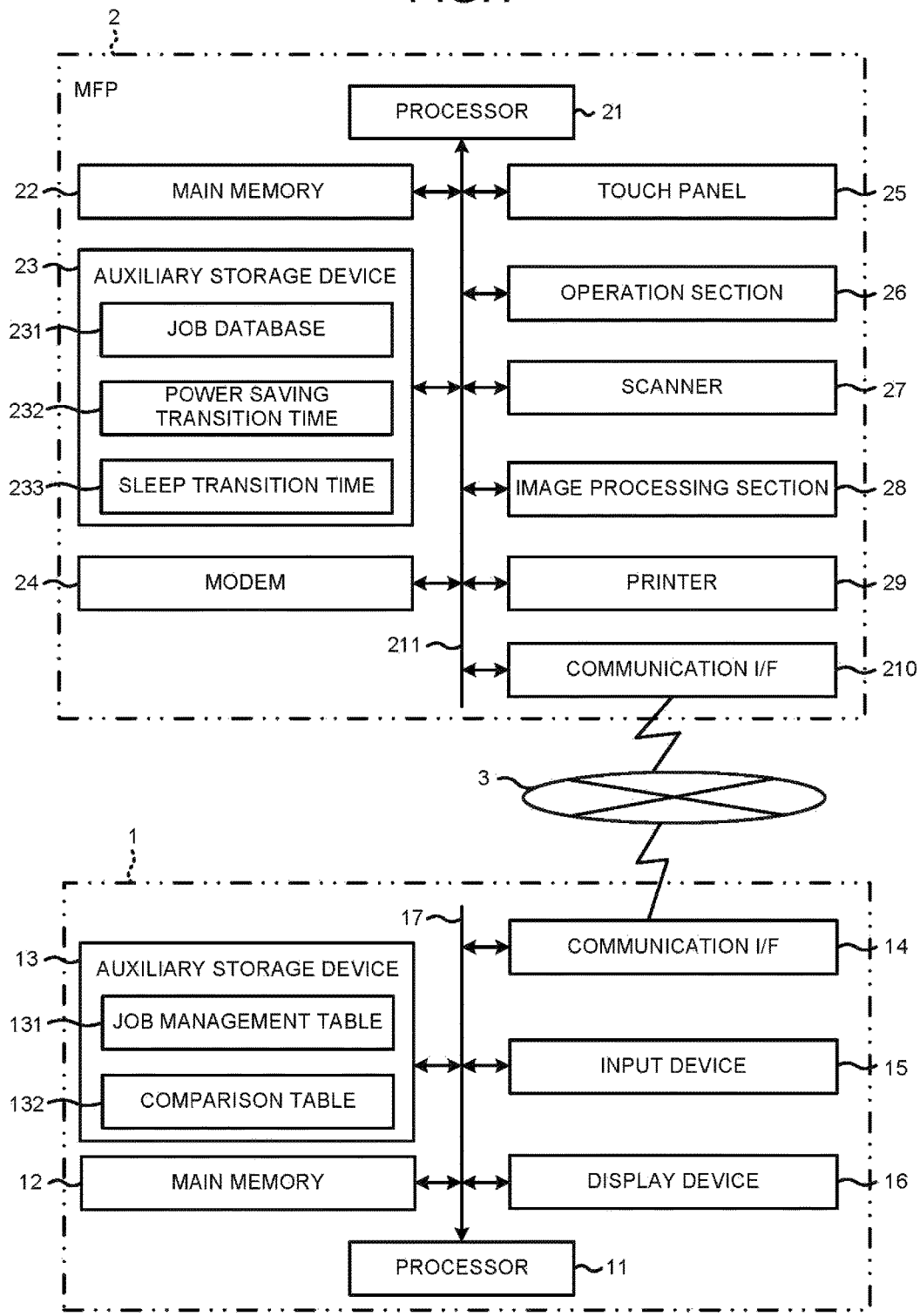
FIG. 1 is a block diagram illustrating the structure of main sections of an MFP and a setting support apparatus.

FIG. 1 is a block diagram illustrating the construction of main sections of an MFP 2 and a setting support apparatus 1 for supporting setting of a transition time to a power saving mode for the MFP 2. First, the constitution of the MFP 2 is described with reference to FIG. 1.

The MFP 2 includes a processor 21, a main memory 22, an auxiliary storage device 23, a modem 24, a touch panel 25, an operation section 26, a scanner 27, an image processing section 28, a printer 29, a communication interface 210 and the like. Furthermore, the MFP 2 has a system transmission path 211, and all the above-mentioned components are connected with the system transmission path 211 around the processor 21. The MFP 2 constitutes a computer by connecting the main memory 22 and the auxiliary storage device 23 to the processor 21 through the system transmission path 211.

The processor 21 acts as a central part of the computer. The processor 21 controls each section to realize various functions as the MFP 2 according to an operating system and application programs.

The main memory 22 acts as a main storage section of the computer. The main memory 22 includes a nonvolatile memory area and a volatile memory area. The main memory 22 stores an operating system and an application program in the nonvolatile memory area. In addition, the main memory 22 stores data necessary for the processor 21 to execute a processing for controlling each section in the nonvolatile or volatile memory area in some cases. The main memory 22 uses the volatile memory area as a work area where data is appropriately rewritten by the processor 21.

The auxiliary storage device 23 acts as an auxiliary storage section of the computer. For example, an HDD (Hard Disc Drive), an SSD (Solid State Drive), an EEPROM (Electric Erasable Programmable Read-Only Memory), and the like are used as the auxiliary storage device 23. The auxiliary storage device 23 stores data used by the processor 21 to execute various processing and data generated by a processing by the processor 21. The auxiliary storage device 23 also stores the above-mentioned application program in some cases.

The modem 24 is an interface for connecting to an external network line, for example, an Internet. The touch panel 25 functions as an input device and a display device of the MFP 2. The operation section 26 includes hard keys such as a numeric pad, a cursor key, a copy start key and the like. The scanner 27 optically scans an original document and converts the original document to image data. The image processing section 28 executes various processing on the image data. The printer 29 prints the image data on a paper. As the printer 29, various systems such as an electrophotographic system and an ink jet system are considered; however, in the present embodiment, an electrophotographic system is used. The communication interface 210 is an interface for connecting to an internal network, for example, a LAN (Local Area Network) 3.

The MFP 2 having such a structure forms a job database 231 in the auxiliary storage device 23 for accumulating log data of an input job. The log data of the job includes at least date and time data on which the job is input.

The MFP 2 has a function of switching to a power saving mode if a standby time of the job passes a predetermined time for the purpose of reducing the consumed power. The power saving mode contains a power saving mode in which the consumed power is saved more than that in the job standby time and a sleep mode which significantly suppresses the consumed power compared with the power saving mode. In other words, if the job is not input for a certain time in the normal job standby mode, in other words, a so-called ready mode, the MFP 2 becomes the power saving mode. The time to switch from the ready mode to the power saving mode, in other words, a so-called power saving transition time T11, is set in a power saving transition time memory 232 of the auxiliary storage device 23. If the job is not input for a certain time after in the power saving mode, the MFP 2 is in the sleep mode. The time to switch from the power saving mode to the sleep mode, in other words, a so-called sleep transition time T12 is also set in a sleep transition time memory 233 of the auxiliary storage device 23. The power saving transition time T11 and the sleep transition time T12 can be arbitrarily changed by an operation on the operation section 26, for example. It is also possible to set the power saving transition time T11 and the sleep transition time T12 by receiving support of the setting support apparatus 1.

Next, the setting support apparatus 1 is described.

The setting support apparatus 1 has a processor 11, a main memory 12, an auxiliary storage device 13, a communication interface 14, an input device 15, a display device 16, and the like. Further, the setting support apparatus 1 has a system transmission path 17 and connects all the above-mentioned components with the system transmission path 17 around the processor 11. The setting support apparatus 1 constitutes a computer by connecting the main memory 12 and the auxiliary storage device 13 to the processor 11 through the system transmission path 17.

The processor 11 acts as a central part of the computer. The processor 11 controls each section to realize various functions of the setting support apparatus 1 according to an operating system and application programs.

The main memory 12 acts as a main storage section of the computer. The main memory 12 includes a nonvolatile memory area and a volatile memory area. The main memory 12 stores an operating system and an application program in the nonvolatile memory area. In addition, the main memory 12 stores data necessary for the processor 11 to execute a processing for controlling each section in the nonvolatile or volatile memory area in some cases. The main memory 12 uses the volatile memory area as a work area where data is appropriately rewritten by the processor 11.

The auxiliary storage device 13 acts as an auxiliary storage section of the computer. For example, an HDD, an SSD, an EEPROM and the like are used as the auxiliary storage device 13. The auxiliary storage device 13 stores data used by the processor 11 to execute various processing and data generated by a processing by the processor 11. The auxiliary storage device 13 also stores the above-mentioned application program in some cases.

The communication interface 14 may be an interface for connecting to an internal network, for example, the LAN 3. The input device 15 is a device for inputting various data, and may be a keyboard, a mouse, and the like. The display device 16 displays various screens, and may be, for example, a liquid crystal display.

The setting support apparatus 1 having such a constitution supports setting of the power saving transition time T11 and the sleep transition time T12 of the MFP 2 connected to the LAN 3 by connecting to the LAN 3 via the communication interface 14. As such a setting support apparatus 1, a general personal computer or the like can be applied.

In order to support setting of the power saving transition time T11 and the sleep transition time T12 of the MFP 2, the setting support apparatus 1 stores a job management table 131 and a comparison table 132 in the auxiliary storage device 13. The setting support apparatus 1 stores a dedicated application program, in other words, a so-called setting support program, in the main memory 12 or the auxiliary storage device 13 to support the same setting.

FIG. 2 is a pattern diagram illustrating an example of the job management table 131. As shown in FIG. 2, the job management table 131 has an area for storing a number of jobs and a cumulative ratio separately for the standby time. The standby time is a time from the end of a previous job until the start of a next job in the MFP 2 which is a support object. For example, if the next job is input thirty seconds later since the end of the previous job, the standby time is zero minutes. Similarly, if the next job is input five minutes and ten seconds later since the previous job is ended, the standby time is 5 minutes.

In the job management table 131 of the present embodiment, the time is classified in units of one minute until ten minutes of the standby time, in units of two minutes until twenty minutes thereof, and in units of five minutes until fifty minutes thereof, and the time is further classified in 60 minutes and 60 minutes or more. The classification of the standby time is not limited to that. If necessary, the time can be divided into appropriate time intervals.

The number of jobs is the number of times of the jobs input in the corresponding standby time. The setting support apparatus 1 acquires the log data of the job accumulated in the job database 231 from the MFP 2 which is the support object via the LAN 3. Then, the log data in a preset period, for example, last 60 days is analyzed to calculate the number of jobs by the standby time. For example, if the next job is input thirty seconds after the end of the previous job, the number of jobs corresponding to the standby time zero minutes is incremented only by "1". Similarly, if the next job is input five minutes and ten seconds after the end of the previous job, the number of jobs corresponding to the standby time five minutes is incremented only by "1".

The cumulative ratio is a ratio of a total sum of the number of jobs which is the total amount of the analyzed log data and a sum of the number of jobs input by the corresponding standby time. If the total sum of the number of jobs is set to A and the sum of the number of jobs is B, a cumulative ratio C is calculated by the following equation (1).

$$C(\%) = (A/B) * 100 \tag{1}$$

FIG. 3 is a pattern diagram illustrating an example of the comparison table 132. As shown in FIG. 3, the comparison table 132 includes an area for storing a current power saving transition time T11, a current sleep transition time T12 and a current consumed power amount W1, an area for storing a changed power saving transition time T21, a changed sleep transition time T22 and a consumed power amount W2, and an area for storing a reduced power amount ΔW. The reduced power amount ΔW is calculated by the following equation (2).

$$\Delta W = W1 - W2 \tag{2}$$

Figure 4:
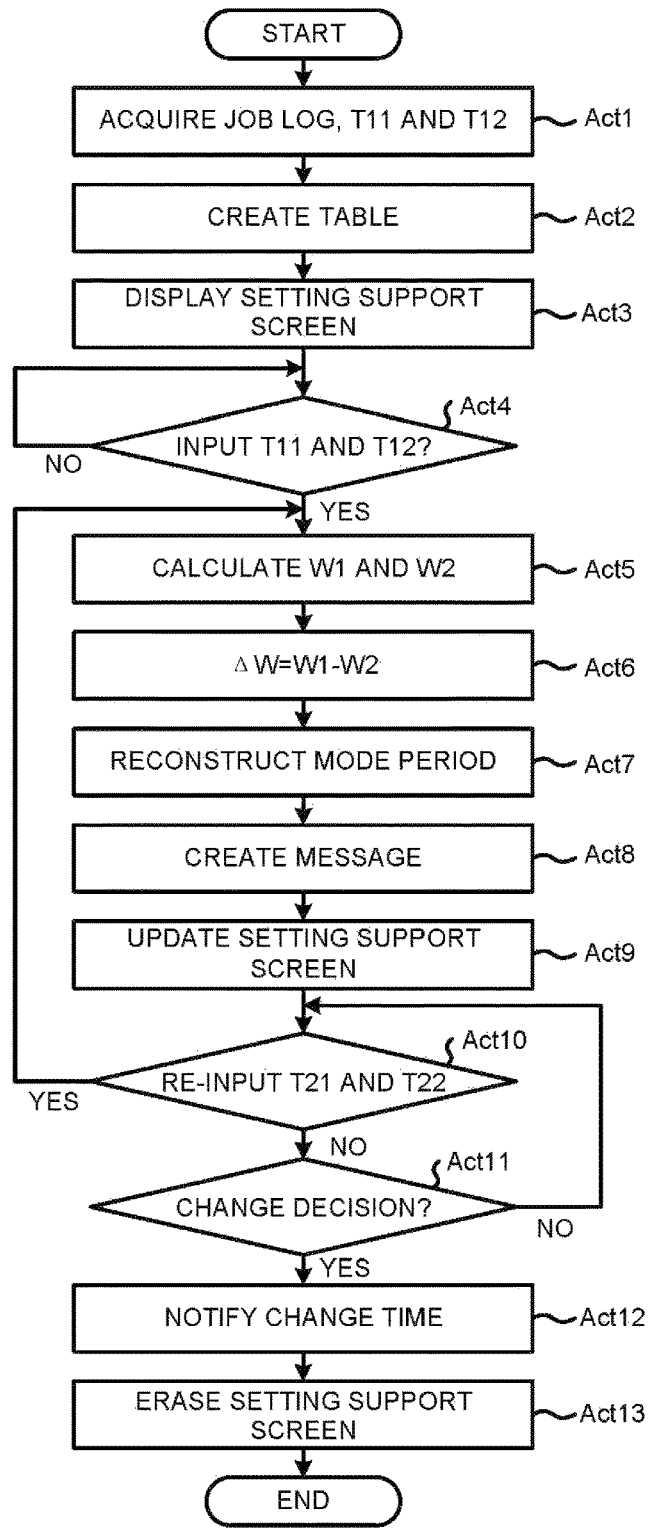
FIG. 4 is a flow chart illustrating procedures of a setting support processing executed by a processor of the setting support apparatus in accordance with a setting support program according to a first embodiment.

FIG. 4 is a flow chart illustrating procedures of a setting support processing executed by the processor 11 in accordance with the setting support program. A content of the processing shown in FIG. 4 and described below is merely an example. If the same result can be obtained, the processing procedure and the processing content thereof are not particularly limited.

First, a user who executes a simulation for resetting the power saving transition time T11 and the sleep transition time T12 of the MFP 2 operates the input device 15 of the setting support apparatus 1 to start the setting support program. The user operates the input device 15 to select the MFP 2 which is a setting support object among the apparatuses connected to the LAN 3. Through the above operations, the processor 11 starts the information processing having the procedures shown in the flow chart in FIG. 4.

The processor 11 controls the communication interface 14 to acquire the log data of the job stored in the job database 231 from the MFP 2 and the power saving transition time T11 and the sleep transition time T12 respectively set in the power saving transition time memory 232 and the sleep transition time memory 233 (Act 1). By the control, the communication interface 14 connects to the communication interface 210 of the corresponding MFP 2 through the LAN 3 to instruct reading of data. If receiving the command, the processor 21 of the MFP 2 controls the communication interface 210 to send the log data of the job and the data of the power saving transition time T11 and the sleep transition time T12 to the setting support apparatus 1. By the control, the communication interface 210 transmits the log data of the job stored in the job database 231 and the power saving transition time T11 and the sleep transition time T12 respectively set in the power saving transition time memory 232 and the sleep transition time memory 233 to the setting support apparatus 1 via the LAN 3. Thus, the setting support apparatus 1 can acquire the log data of the job and the data of the power saving transition time T11 and the sleep transition time T12 from the MFP 2 which is the setting support object.

The processor 11 creates the job management table 131 and the comparison table 132 (Act 2). Specifically, the processor 11 reads out the job management table 131 stored in the auxiliary storage device 13 and copies or decompresses it in the volatile memory area of the main memory 12. Then, the processor 11 analyzes the log data of the job in the preset period, for example, the last 60 days, calculates the number of jobs and the cumulative ratio by the standby time, and stores the job management table 131 copied or decompressed in the volatile memory area. Similarly, the processor 11 reads out the comparison table 132 stored in the auxiliary storage device 13 to copy or decompress it in the volatile memory area of the main memory 12. Then, the processor 11 stores the data of the power saving transition time T11 and the sleep transition time T12 acquired from the MFP 2 in areas of the current power saving transition time and the sleep transition time in the comparison table 132 copied or decompressed in the volatile memory area.

By executing the processing in Act 2, the processor 11 realizes an arithmetic module for calculating the degree of the job (the cumulative ratio) executed until the standby time from a value (number of jobs) obtained by totaling the number of times the jobs executed by the job execution apparatus (the MFP 2) in each standby time after the previous job ends.

After creating the job management table 131 and the comparison table 132, the processor 11 displays a setting support screen SC1 on the display device 16 (Act 3).

Figure 5:
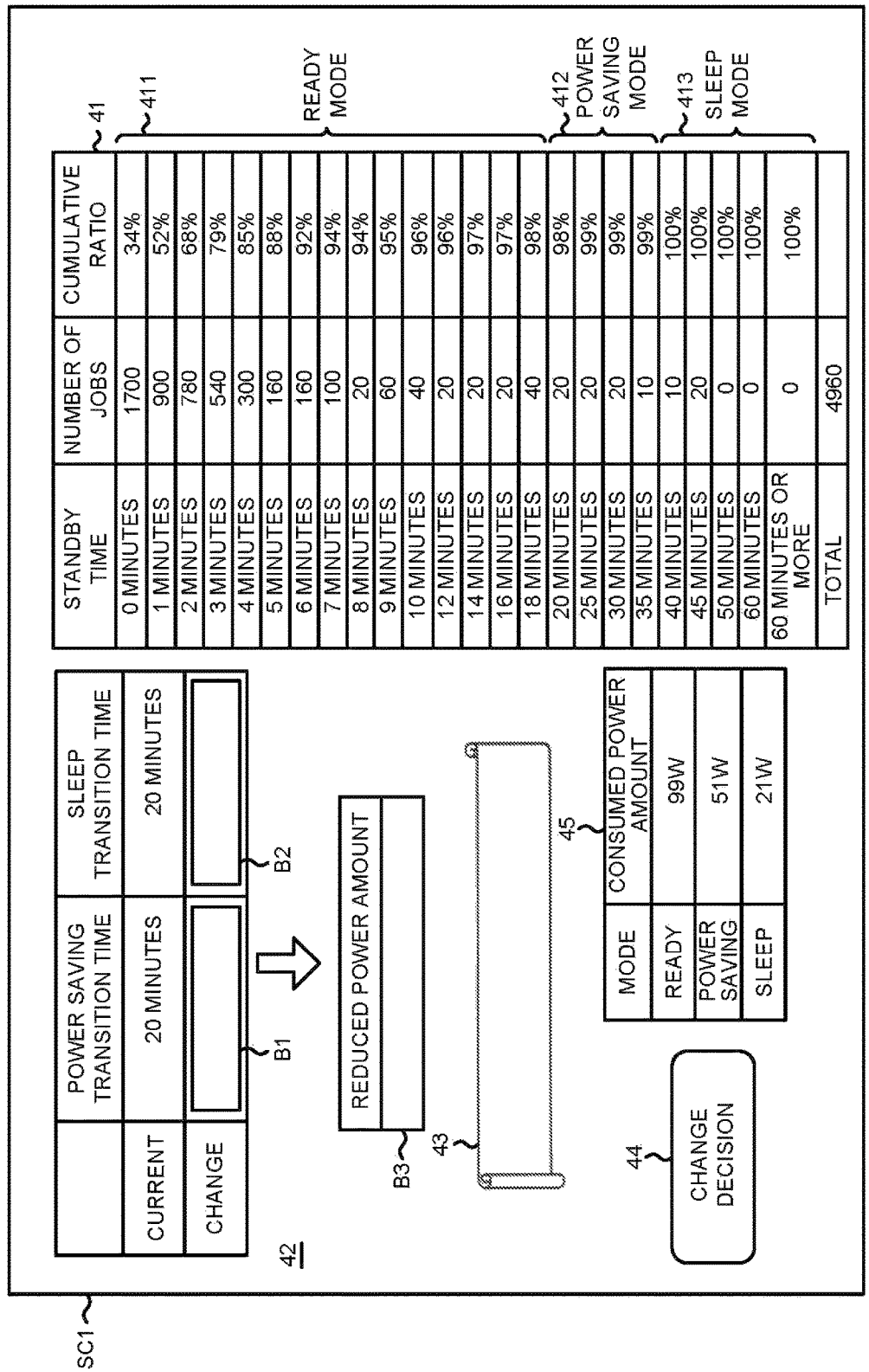
FIG. 5 is a pattern diagram illustrating an example of a setting support screen according to the first embodiment.

FIG. 5 is a diagram illustrating an example of the setting support screen SC1. As shown in FIG. 5, in the setting support screen SC1, images 41, 42, 43, 44 and 45 are displayed.

The image 41 displays a list of the number of jobs and the cumulative ratios for the standby time stored in the job management table 131. The image 41 includes FIGS. 411, 412 and 413 respectively showing a ready mode period, a power saving mode period and a sleep mode period based on the current power saving transition time T11 and the sleep transition time T12. Texts indicating the modes are also added to the FIGS. 411, 412, 413. By the way, the setting support screen SC1 in FIG. 5 shows a case where the current power saving transition time T11 and the sleep transition time T12 are both twenty minutes.

The image 42 displays the current power saving transition time T11 and the current sleep transition time T12 stored in the comparison table 132 and also displays boxes B1 and B2 for respectively inputting the power saving transition time T21 and the sleep transition time T22 after change. Further, a box B3 for displaying the reduced power amount ΔW estimated by changing the power saving transition time T21 and the sleep transition time T22 is also included in the image 42.

The image 43 shows an area for displaying various messages. The message mainly informs a user of a condition of the convenience in the case of changing the power saving transition time T21 and the sleep transition time T22.

The image 44 shows an area of a change decision button. By executing an operation through hitting a cursor on the screen SC1 within the area of the image 44 and, the processor 11 recognizes that the change decision button is input. The execution operation may be, for example, a left click operation on a mouse or an Enter key operation on a keyboard.

The image 45 shows consumed power amount w1, w2 and w3 which are indications at the time on which the MFP 2 is in the ready mode, the power saving mode, and the sleep mode. The consumed power amount w1, w2 and w3 in each mode may be preset in the auxiliary storage device 13 or may be acquired together with the log data of the job from the MFP 2.

The user who confirms the setting support screen SC1 executes a simulation in the case where the power saving transition time T21 and the sleep transition time T22 of the MFP 2 are changed. The user inputs the desired power saving transition time T21 and sleep transition time T22 in the boxes B1 and B2. For example, the user inputs 6 (minutes) as the power saving transition time T21 after change in the box B1 and 2 (minutes) as the sleep transition time T22 after change in the box B2.

The processor 11 enabling the setting support screen SC1 to be displayed stands by until numerical values are input in boxes B1 and B2 (Act 4). Then, for example, if numerical values are input to the boxes B1 and B2 by the numeric pad operation of the input device 15, respectively, the processor 11 recognizes the numerical value input to the box B1 as the power saving transition time T21. Similarly, the processor 11 recognizes the numerical value input to the box B2 as the sleep transition time T22. The processor 11 stores the power saving transition time T21 and the sleep transition time T22 in the comparison table 132.

Here, the processor 11 cooperates with the input device 15 and the display device 16 to execute the processing in Act 4 to realize an input reception module which receives input of the transition time to the power saving mode set in the job execution apparatus (the MFP 2).

If the power saving transition time T21 and the sleep transition time T22 are input (Yes in Act 4), the processor 11 calculates the current consumed power amount W1 and the consumed power amount W2 after change respectively and stores them in the comparison table 132 (Act 5).

The current consumed power amount W1 is calculated by the following procedures. The processor 11 first calculates a ready mode time t1, a power saving mode time t2, and a sleep mode time t3 for each standby time of the job management table 131. For example, if the current power saving transition time T11 is twenty minutes and the sleep transition time T12 is twenty minutes, the ready mode time t1 is twenty minutes, the power saving mode time t2 is zero minutes, and the sleep mode time t3 is zero minutes from zero minutes to twenty minutes of the standby time. From twenty-one minutes to forty minutes of the standby time, the ready mode time t1 is twenty minutes, the power saving mode time t2 is "the standby time—twenty minutes", and the sleep mode time t3 is zero minutes. From forty minutes or more of the standby time, the ready mode time t1 is twenty minutes, the power saving mode time t2 is twenty minutes, and the sleep mode time t3 is "the standby time-forty minutes".

Next, the processor 11 obtains the consumed power amount w1, w2 and w3 which are indications of each of the ready mode, the power saving mode and the sleep mode. As described above, the consumed power amount w1, w2 and w3 for each mode is preset in the auxiliary storage device 13. Alternatively, the consumed power amount w1, w2 and w3 are acquired from the MFP 2 together with the log data of the job. After obtaining the consumed power amount w1, w2 and w3, the processor 11 calculates consumed power amount w0 of one job per standby time by the following equation (3).

$$W0=(t1*w1+t2*w2+t3*w3)/60 \qquad (3)$$

Thus, if the consumed power amount w0 of one job per the standby time is calculated, the processor 11 multiplies the consumed power amount w0 for each standby time by the number of jobs in the standby time and further calculates the sum thereof, and in this way, the consumed power amount W1 is calculated.

The processor 11 calculates the consumed power amount W2 in the same procedures. However, at the time of calculating the ready mode time t1, the power saving mode time t2 and the sleep mode time t3 in each standby time, the processor 11 uses the power saving transition time T21 and the sleep transition time T22 after change.

After the consumed power amount W1 and the consumed power amount W2 are calculated, the processor 11 calculates the reduced power amount $\Delta W$ according to the above-described equation (2) and stores it in the comparison table 132 (Act 6). Thereafter, the processor 11 reconstructs the FIGS. 411, 412 and 413 indicating the ready mode period, the power saving mode period and the sleep mode period after change based on the power saving transition time T21 and the sleep transition time T22 after change (Act 7). In addition, the processor 11 creates a message indicating the condition of the convenience to the user if changing the power saving transition time T21 and the sleep transition time T22 (Act 8).

The content of the message is determined by the cumulative ratio of the standby time just before switching from the ready mode to the power saving mode. For example, if the cumulative ratio is 80% or more, a message having contents such as "since XX % of the job is executed from the ready state, convenience is not impaired" is created. Further, XX % refers to a value of the cumulative ratio. On the other hand, for example, if the cumulative ratio is less than 80%, a message having contents such as "since YY % of the job is executed from the power saving mode, the convenience is impaired" is displayed. YY % is a value obtained by subtracting the value of the cumulative ratio from 100%.

If the reconstitution of the FIGS. 411, 412 and 413 indicating the mode periods and the creation of the message are ended, the processor 11 updates the setting support screen SC1 (Act 9).

Figure 6:
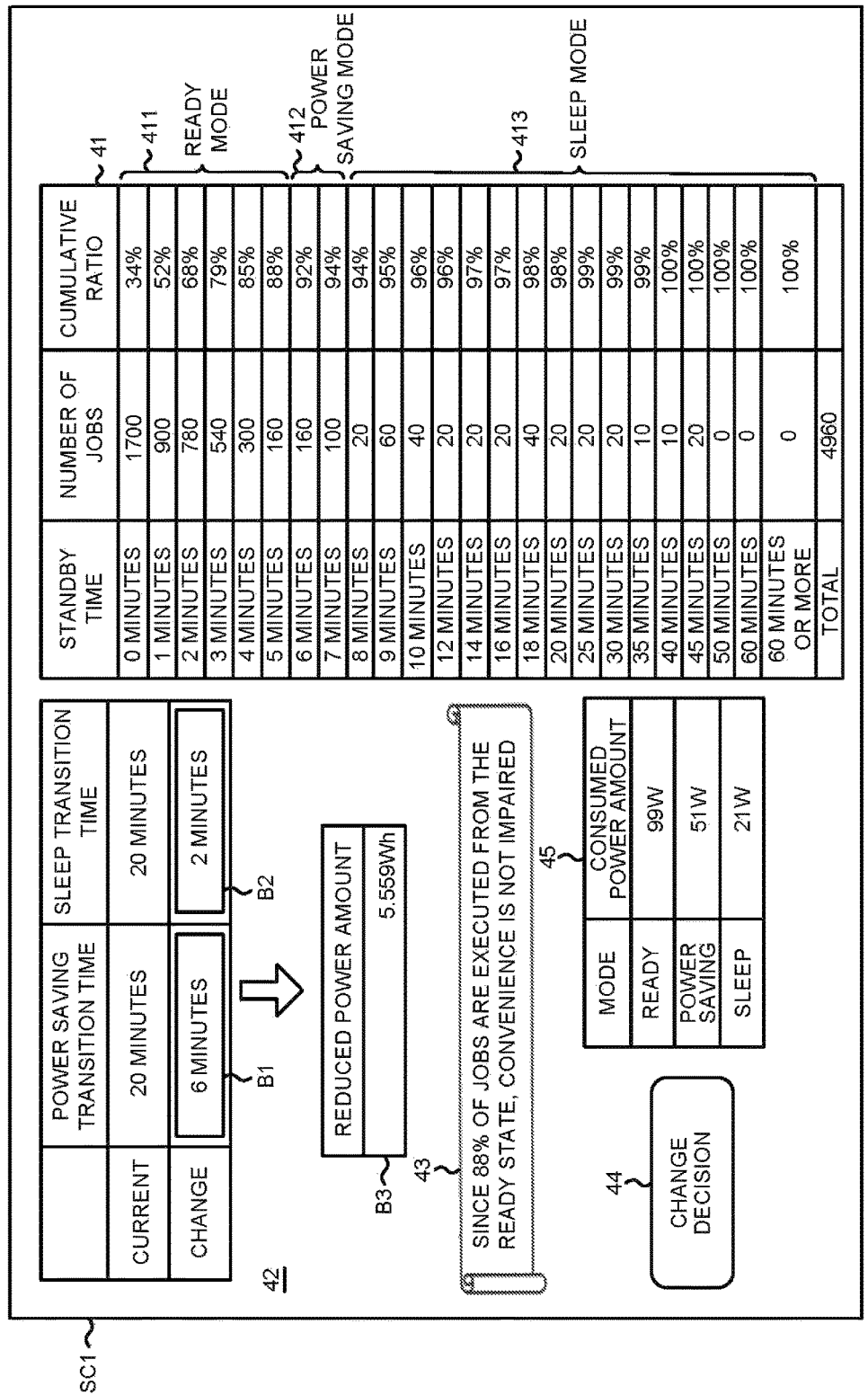
FIG. 6 is a pattern diagram illustrating an example of the same setting support screen after updating.

FIG. 6 is a diagram illustrating an example of the setting support screen SC1 after updating. In this example, simulation is executed in which the user changes the power saving transition time to six minutes and the sleep transition time to two minutes, respectively. On the setting support screen SC1, "six minutes" is displayed in the box B1 and "two minutes" is displayed in the box B2, respectively. "5,559 Wh" is displayed as the reduced power amount $\Delta W$ in the box B3. The FIGS. 411, 412 and 413 indicating the ready mode period, the power saving mode period and the sleep mode period are reconstructed, and in the image 43, a message having contents such as "since 88% of jobs are executed from the ready state, the convenience is not impaired" is displayed. Therefore, the user, who confirms the FIGS. 411, 412 and 413 showing the ready mode period, the power saving mode period and the sleep mode period and the message in the image 43, can easily know the convenience is not impaired even if the power saving transition time and the sleep transition time are changed.

Here, the processor 11 executes the processing in Act 6 to realize a reduced power amount calculation module to calculate the reduced power amount if the transition time of which the input is received by the input reception module is set in the job execution apparatus (the MFP 2. The processor 11 cooperates with the display device 16 and executes the processing in Act 7 to Act 9 to realize an output module for outputting information on the degree of the job executed by the job execution apparatus (the MFP 2) until the transition time of which the input is received by the input reception module based on the calculation result by the arithmetic module. The output module further outputs the reduced power amount calculated by the reduced power amount calculation module.

After updating the setting support screen SC1, the processor 11 confirms whether or not the numerical values are input in the boxes B1 and B2 again (Act 10. If the numerical values are not input again (NO in Act 10), the processor 11 confirms whether or not the change decision button on the setting support screen SC1 is input (Act 11). If the change decision button is not input (NO in Act 11), the processor 11 again confirms whether or not the numerical values are input in the boxes B1 and B2 again (Act 10). Here, the processor 11 waits until the numerical values are input in the boxes B1 and B2 again or the change decision button is input in the processing in Act 10 and Act 11.

If confirming that the numerical value is input in at least one of the boxes B1 and B2 again (Yes in Act 10), the processor 11 returns to the processing in Act 5, and then executes the processing subsequent to Act 5 in the same way as described above. Therefore, the user can simulate another pattern simply by inputting a new time in at least one of the boxes B1 and B2.

In the standby state in Act 10 and Act 11, if confirming that the change decision button is input (Yes in Act 11), the processor 11 controls the communication interface 14 to notify the MFP 2 which is the support object of the power saving transition time T21 and the sleep transition time T22 after change (Act 12). Through this control, the communication interface 14 transmits the data of the power saving transition time T21 and the sleep transition time T22 stored in the comparison table 132 to the MFP 2 which is the support object via the LAN 3. The processor 21 of the MFP 2 receiving the data changes the power saving transition time T11 and the sleep transition time T12 in the power saving transition time memory 232 and the sleep transition time memory 233 to the power saving transition time T21 and the sleep transition time T22.

Here, the processor 11 cooperates with the communication interface 14 and executes the processing in Act 12 to realize a setting module for setting the transition time of which the input is received by the input reception module to the job execution apparatus (MFP).

After notifying the power saving transition time T21 and the sleep transition time T22 after change, the processor 11 erases the setting support screen SC1 (Act 13). As stated above, the processor 11 terminates the information processing according to the setting support program.

As described above, according to the setting support apparatus 1 of the present embodiment, the user can easily execute the simulation in the case of changing the power saving transition time and the sleep transition time in consideration of the convenience of the MFP 2. Moreover, not only the convenience but also the consumed power reduction amount in the case of changing the power saving transition time and the sleep transition time can be confirmed, so it is possible to find out the appropriate power saving transition time and sleep transition time by simulation. In addition, the user can set the appropriate power saving transition time and sleep transition time found by the simulation in the MFP 2 simply by operating the change decision button on the setting support screen SC1.

Figure 7:
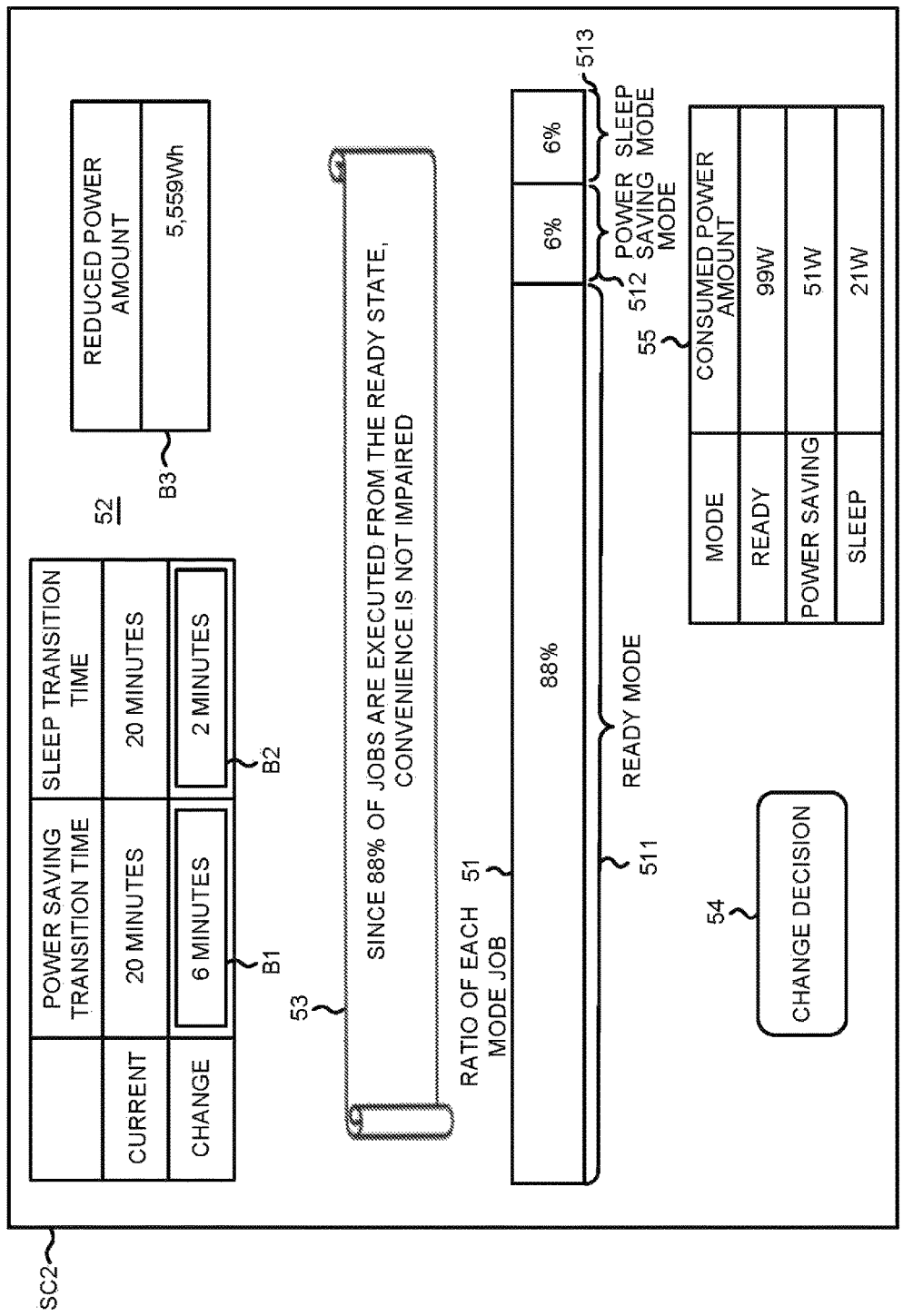
FIG. 7 is a pattern diagram illustrating another example of the same setting support screen.

The setting support screen SC1 is not limited to that shown in FIG. 5. FIG. 7 is a pattern diagram illustrating another example (setting support screen SC2) of the setting support screen SC1. As shown in the FIG. 7, images 51, 52, 53, 54 and 55 are displayed on the setting support screen SC2. Among them, the image 52, the image 53, the image 54, and the image 55 are the same as the images 42, 43, 44 and 45 of the setting support screen SC1 except for the layout.

The image 51 is a graph of a ratio of jobs input in each of the ready mode, the power saving mode and the sleep mode. The image 51 includes FIGS. 511, 512 and 513 respectively indicating the ready mode period, the power saving mode period and the sleep mode period. Text that indicates the mode is also added to the FIGS. 511, 512, and 513. Even if such an image 51 is included in the setting support screen SC2, the user can easily execute simulation in the case of changing the power saving transition time and the sleep transition time in consideration of the convenience of the MFP 2.

The image 51 is not limited to an image of a bar graph as shown in FIG. 7, but may be an image of a pie chart, for example.

Second Embodiment

Next, the second embodiment of the setting support apparatus 1 is described with reference to FIG. 8 to FIG. 10. The difference between the first embodiment and the second embodiment is a part of the information processing procedure executed by the processor 11 of the setting support apparatus 1 according to the setting support program and the constitution of the setting support screen. Therefore, the common sections are donated with the same reference numerals, and FIG. 1 to FIG. 3 are used as it is in the second embodiment, and the description thereof is omitted.

Figure 8:
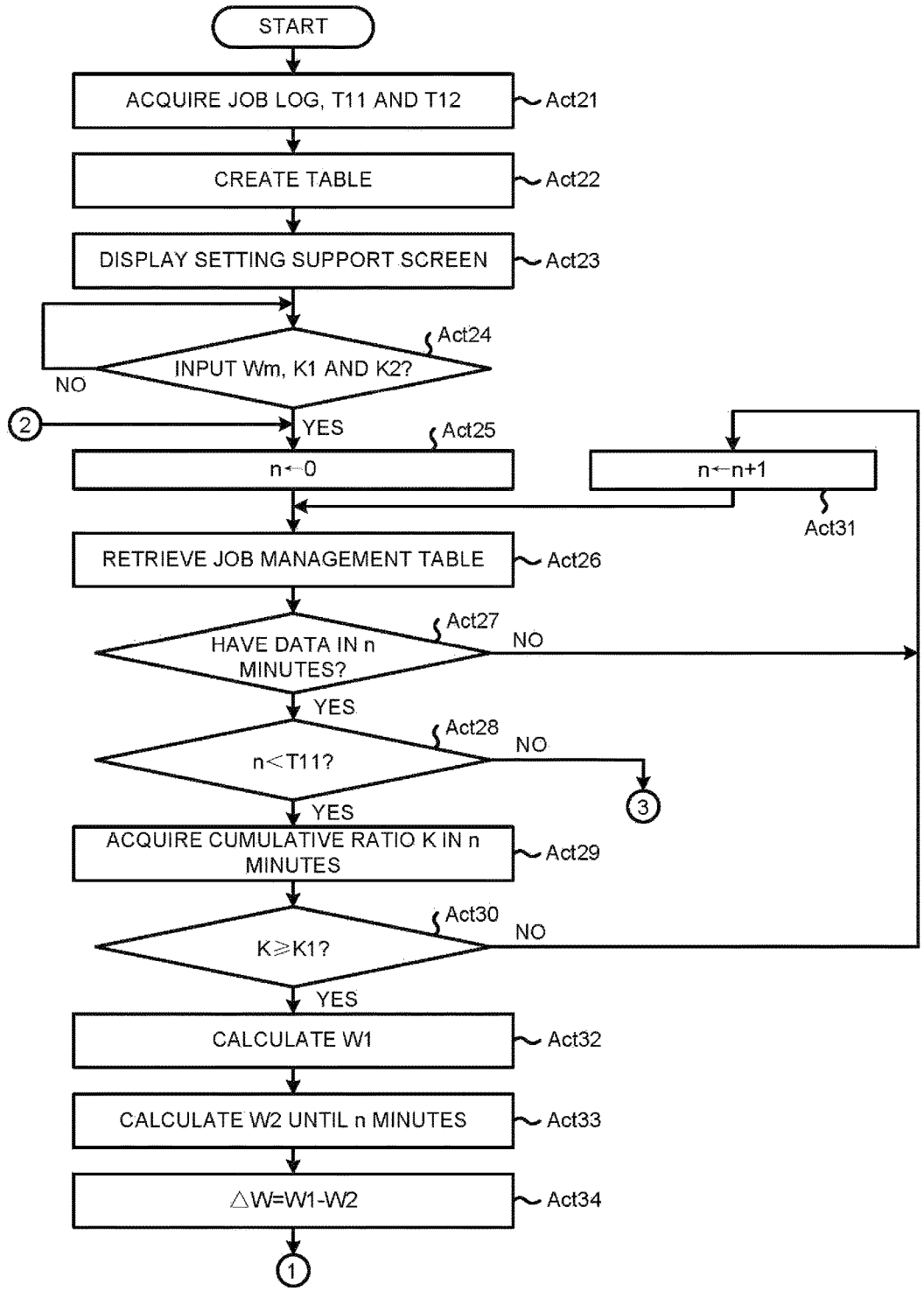
FIG. 8 is a flow chart illustrating procedures of a setting support processing executed by a processor of a setting support apparatus in accordance with a setting support program according to a second embodiment.
Figure 9:
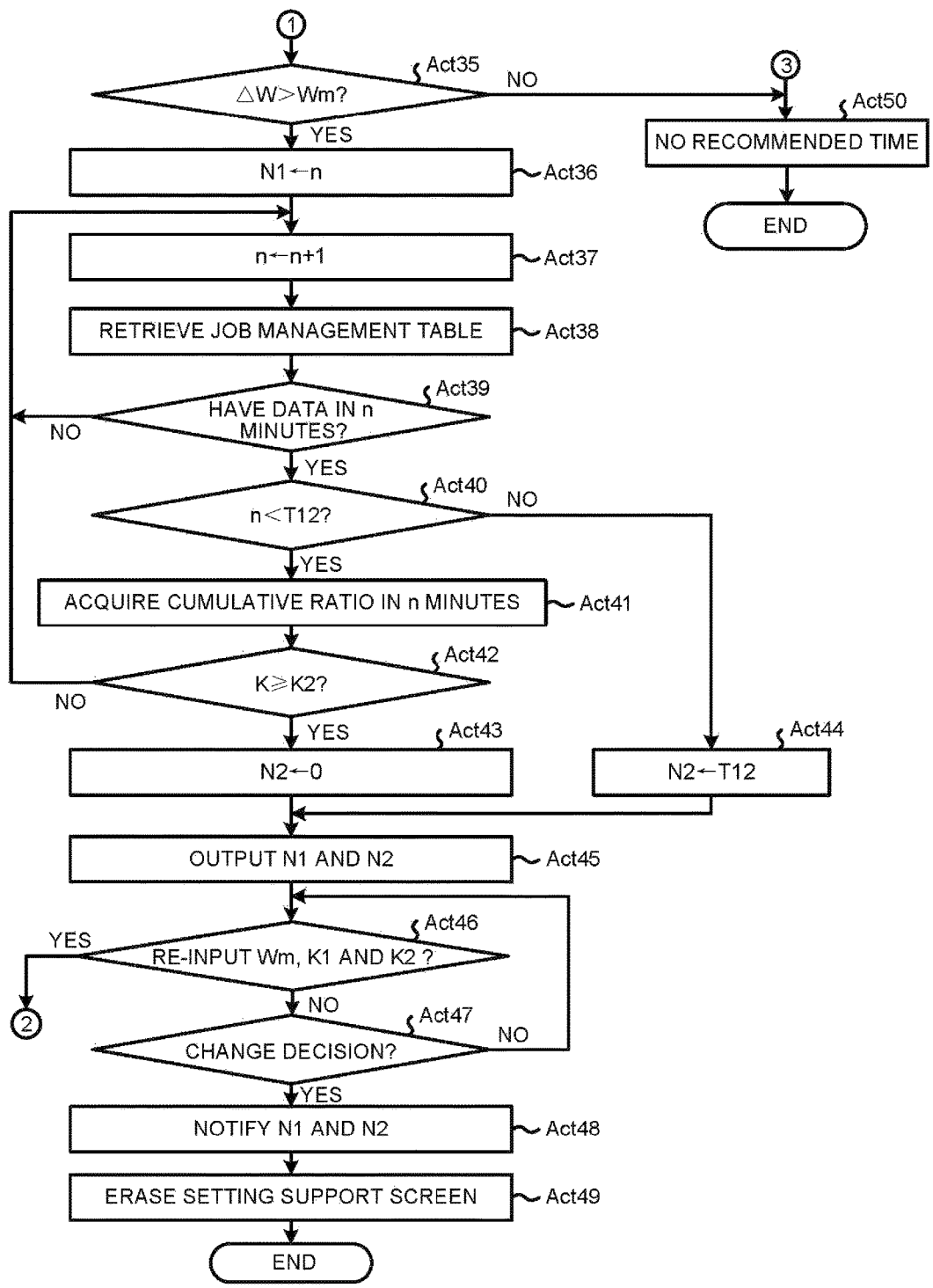
FIG. 9 is a flow chart illustrating procedures of the setting support processing executed by the processor of the setting support apparatus in accordance with a setting support program according to the second embodiment.

FIG. 8 is a flow chart illustrating procedures of the setting support processing executed by the processor 11 in accordance with a setting support program. A content of the processing shown in FIG. 8 and described below is merely an example. If the same result can be obtained, the processing procedure and the processing content thereof are not particularly limited.

First, a user who executes the simulation for resetting the power saving transition time T11 and the sleep transition time T12 of the MFP 2 operates the input device 15 of the setting support apparatus 1 to start the setting support program. The user operates the input device 15 to select the MFP 2 which is a setting support object among the apparatuses connected to the LAN 3. By executing the above operations, the processor 11 starts the information processing having the procedures shown in the flow chart in FIG. 8.

The processor 11 executes the same processing as Act 1 to Act 3 of the first embodiment (Act 21 to Act 23). The processor 11 acquires the log data of the job stored in the job database 231 from the MFP 2 and the power saving transition time T11 and the sleep transition time T12 respectively set in the power saving transition time memory 232 and the sleep transition time memory 233. The processor 11 forms the job management table 131 and the comparison table 132 in the main memory 12 based on the data acquired from the MFP 2. The processor 11 displays a setting support screen SC3 on the display device 16.

By executing the processing in Act 22, the processor 11 realizes the arithmetic module for calculating the degree of the job executed until the standby time from a value obtained by totaling the number of times the jobs executed by the job execution apparatus (the MFP 2) in each standby time after the previous job ends.

Figure 10:
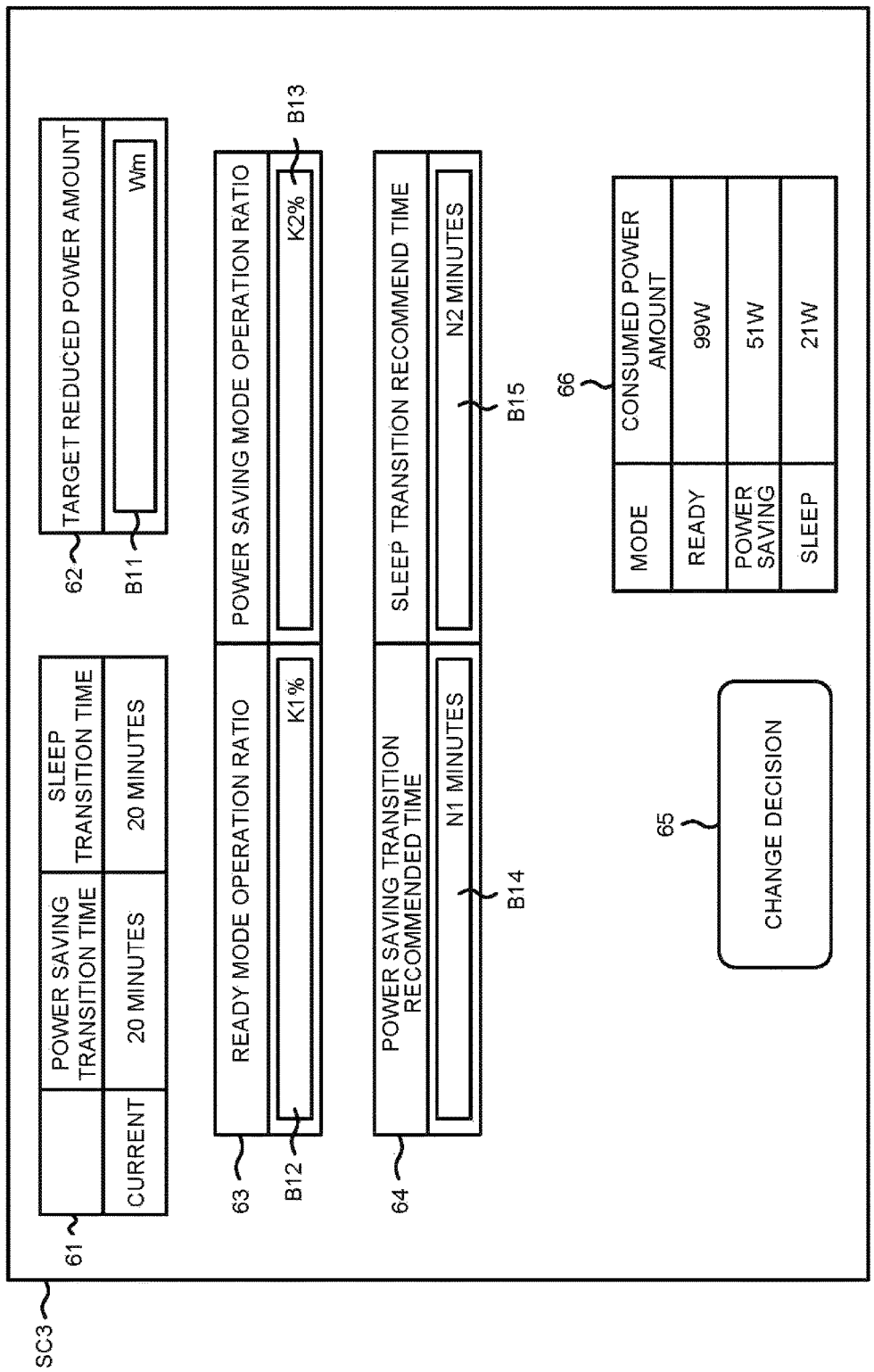
FIG. 10 is a pattern diagram illustrating an example of a setting support screen according to the second embodiment.

FIG. 10 is a diagram illustrating an example of the setting support screen SC3. As shown in the FIG. 10, the setting support screen SC3 displays images 61, 62, 63, 64, 65 and 66. Among them, the image 65 and the image 66 are the same as the image 44 and the image 45 of the setting support screen SC1 or the image 54 and the image 55 of the setting support screen SC2 in the first embodiment.

The image 61 displays the power saving transition time T11 and the sleep transition time T12 of the MFP 2 respectively stored in each area of the current power saving transition time and the sleep transition time of the comparison table 132.

The image 62 displays a box B11 for inputting a target reduced power amount Wm. The reduced power amount Wm is a target value of the reduced power amount for the consumed power amount W1 calculated based on the current power saving transition time T11 and the sleep transition time T12. For example, in a case of desiring to reduce the consumed power amount W1 by 5000 Wh, the user inputs "5000" in the box B11.

The image 63 displays boxes B12 and B13 for inputting a ready mode operation ratio K1 (%) and a power saving mode operation ratio K2 (%). The ready mode operation ratio K1 (%) is a target value indicating the ratio of jobs that can be executed in the state of the ready mode. The power saving mode operation ratio K2 (%) is a target value indicating the ratio of jobs that can be executed in the state of the power saving mode. The power saving mode operation ratio K2 (%) is larger than the ready mode operation ratio K1 (%).

For example, if it is desirable that 80% of all the jobs can be executed in the ready mode state and 95% can be executed in the state of the power saving mode, the user inputs "80" in the box B12 and "95" in the box B13. Incidentally, if "80" and "95" are input in the boxes B12 and B13, 80% of all the jobs are executed in the state of the ready mode, so the convenience is high. The percentage of jobs executed in the state of the power saving mode or the sleep mode in which the warm-up time becomes longer is 20%, the percentage of jobs executed in the state of the sleep mode with the longest warm-up time among them is 5%, so the convenience is not impaired. Needless to say, the ready mode operation ratio evaluated as high convenience is not limited to "80". Similarly, the power saving mode operation ratio evaluated as no impairment in the convenience is not limited to "95". These values are arbitrary and may be appropriately replaced by the evaluation of the user.

The image 64 shows boxes B14 and B15 for displaying a power saving transition recommended time N1 (minutes) and a sleep recommended time N2 (minutes). The power saving transition recommended time N1 (minutes) and the sleep recommended time N2 (minutes) are calculated based on the values input in the boxes B11, B12, and B13, respectively, and displayed in the boxes B14 and B15 of the image 64.

The user who confirms the setting support screen SC3 carries out a simulation on the target reduced power amount Wm, the ready mode operation ratio K1 and the power saving mode operation ratio K2. The user inputs a desired reduced power amount Wm in the box B11. The user inputs the desired ready mode operation ratio K1 and power saving mode operation ratio K2 in the boxes B12 and B13.

The processor 11 enabling the setting support screen SC3 to be displayed waits for input of the numerical values in the boxes B11, B12, and B13 (Act 24). Then, for example, if a numerical value is input in the box B11 by the numeric pad operation of the input device 15, the processor 11 recognizes the numerical value input in the box B11 as the target reduced power amount Wm. Similarly, if a numerical value is input in the box B12, the processor 11 recognizes the numerical value input in the box B12 as the ready mode operation ratio K1. If a numerical value is input in the box B13, the processor 11 recognizes the numerical value input in the box B13 as the power saving mode operation ratio K2.

The processor 11 cooperates with the input device 15 and executes the processing in Act 24 to realize the input reception module which receives input of the degree of the job (the ready mode operation ratio) executed in the normal mode before switching to the power saving mode in the job execution apparatus (the MFP 2). The input reception module also receives the target value of the consumed power amount which is reduced by switching to the power saving mode in the job execution apparatus (the MFP 2).

If confirming that the numerical values are input in the boxes B11, B12, and B13 (Yes in Act 24), the processor 11 resets a counter n to "0" (Act 25). The counter n is formed as a counter memory in the main memory 12, for example.

If the counter n is reset, the processor 11 retrieves the job management table 131 (Act 26). Then, the processor 11 confirms whether or not there is the data of the number of jobs and the cumulative time in a case in which the standby time is n minutes (n is the value of the counter n) (Act 27). If the data in n minutes exists (Yes in Act 27), the processor 11 determines whether or not n minutes are shorter than the current power saving transition time T11 (Act 28). If n minutes are shorter than the current power saving transition time T11 (Yes in Act 28), the processor 11 acquires a cumulative ratio K of n minutes of the standby time from the job management table 131 (Act 29). Then, the processor 11 confirms whether the cumulative ratio K is equal to or greater than the ready mode operation ratio K1 (Act 30).

If the cumulative ratio K is less than the ready mode operation ratio K1 (NO in Act 30), the processor 11 proceeds to the processing in Act 31. Even in the case where there is no data in n minutes in Act 27 (NO in Act 27), the processor 11 proceeds to the processing in Act 31. In Act 31, the processor 11 counts up the counter n only by "1". The processor 11 then returns to the processing in Act 26 and repeats the processing in the same way as described above.

In Act 30, if the cumulative ratio K is equal to or greater than the ready mode operation ratio K1 (Yes in Act 30), the processor 11 calculates the current consumed power amount W1 according to the procedure described in the processing in Act 5 of the first embodiment (Act 32). The processor 11 calculates the consumed power amount W2 at the time on which the ready mode time is set to n minutes (Act 33). The processor 11 calculates the consumed power amount w0 of one job for each standby time tx up to n minutes by the following equation (4). In equation (4), w1 is the consumed power amount in the ready mode.

$$W0=(tx*W1)/60 \qquad (4)$$

After calculating the consumed power amount w0 of one job for each standby time tx till n minutes, the processor 11 multiplies the consumed power amount w0 for each standby time tx by the number of jobs in the standby time tx and further calculates the sum to calculate the consumed power amount W2 in a case of setting the ready mode time to n minutes.

After calculating the consumed power amount W1 and the consumed power amount W2, the processor 11 calculates the reduced power amount $\Delta W$ by subtracting the consumed power amount W1 from the consumed power amount W2 and stores it in the comparison table 132 (Act 34). Next, the processor 11 confirms whether or not the reduced power amount $\Delta W$ exceeds the target reduced power amount Wm in FIG. 9 (Act 35). If the reduced power amount $\Delta W$ exceeds the target reduced power amount Wm (Yes in Act 35), the processor 11 stores the value of the counter n in the main memory 12 as the power saving transition recommended time N1 (Act 36). For example, the processor 11 stores the power saving transition recommended time N1 in the power saving transition time area of the comparison table 132 after change.

The processor 11 executes the processing in Act 25 to Act 36 to realize a time acquisition module for acquiring the shortest time of the standby time until the job having the degree equal to or greater than a degree of the job the input of which is received by the input reception module is executed in the job execution apparatus (the MFP 2) from a calculation result by the arithmetic module.

Then the processor 11 counts up the counter n only by "1" (Act 37). The processor 11 then retrieves the job management table 131 (Act 38). Then, the processor 11 confirms whether or not there is the data of the number of jobs and the cumulative time when the standby time is n minutes (Act 39). If the data in n minutes exists (Yes in Act 39), the processor 11 determines whether or not n minutes are shorter than the current sleep transition time T12 (Act 40). If n minutes are shorter than the current sleep transition time T12 (Yes in Act 40), the processor 11 acquires the cumulative ratio K when the standby time is n minutes from the job management table 131. Then, the processor 11 confirms whether or not the cumulative ratio K is equal to or greater than the power saving mode operation ratio K2 (Act 42).

If the cumulative ratio K is less than the power saving mode operation ratio K2 (NO in Act 42), the processor 11 returns to the processing in Act 37. In the case where the data in n minutes does not exist in Act 39 (NO in Act 39), the processor 11 returns to the processing in Act 37 as well. The processor 11 then repeats the processing in the same way as described above.

In Act 42, if the cumulative ratio K becomes equal to or greater than the power saving mode operation ratio K2 (Yes in Act 42), the processor 11 stores the value of the counter n in the main memory 12 as the sleep transition recommended time N2 (Act 43). For example, the processor 11 stores the sleep transition recommended time N2 in the sleep transition time area of the comparison table 132 after change.

On the other hand, in Act 40, if n minutes are equal to or greater than the current sleep transition time T12 (NO in Act 40), the processor 11 stores the sleep transition time T12 in the main memory 12 as the sleep transition recommended time N2 (Act 44). For example, the processor 11 stores the sleep transition recommended time N2 in the sleep transition time area of the comparison table 132 after change.

If the processing in Act 43 or Act 44 is ended, the processor 11 displays the power saving transition recommended time N1 and the sleep transition recommended time N2 stored in the main memory (for example, the comparison table 132) in the boxes B14 and B15 formed in the image 64 of the setting support screen SC3 (Act 45).

The processor 11 cooperates with the display device 16 and executes the processing in Act 45 to realize the output module which outputs the shortest time acquired by the time acquisition module.

The processor 11 confirms whether or not the numerical value is input in at least one of the boxes B11, B12, and B13 again (Act 46). If no numerical value is input again (NO in Act 46), the processor 11 confirms whether or not the change decision button of the setting support screen SC3 is input (Act 47). If the change decision button is not input (NO in Act 47), the processor 11 again confirms whether the numerical value is input in at least one of the boxes B11, B12, B13 again (Act 46). The processor 11 waits for until the numerical value is input in the box B11, B12 and B13 again or the change decision button is input in the processing in Act 46 and Act 47.

If the numerical value is input in at least one of the boxes B11, B12, and B13 again (Yes in Act 46), the processor 11 returns to the processing in Act 25, and executes the processing subsequent to Act 25 in the same way as stated above. Therefore, the user can simulate another pattern only by inputting new values in at least one of the boxes B11, B12, and B13.

In the standby state in Act 46 and Act 47, if confirming that the change decision button is input (Yes in Act 47), the processor 11 controls the communication interface 14 to notify the MFP 2 which is the support object of the power saving transition recommended time N1 and the sleep transition recommended time N2. Through the control, the communication interface 14 transmits the data of the power saving transition recommended time N1 and the sleep transition recommended time N2 stored in the main memory 12 (for example, the comparison table 132) to the MFP 2 which is the support object via the LAN 3. If receiving the data, the processor 21 of the MFP 2 changes the power saving transition time T11 and the sleep transition time T12 in the power saving transition time memory 232 and the sleep transition time memory 233 to the power saving transition recommended time N1 and the sleep transition recommended time N2.

The processor 11 cooperates with the communication interface 14 and executes the processing in Act 48 to realize a setting module for setting the shortest time acquired by the time acquisition module in the job execution apparatus (the MFP 2) as the transition time to the power saving mode.

After notifying the power saving transition recommended time N1 and the sleep transition recommended time N2, the processor 11 erases the setting support screen SC3 (Act 49). Through the above, the processor 11 terminates the information processing according to the setting support program.

In Act 28, if n minutes is equal to or greater than the current power saving transition time T11, by the simulation values, it is impossible to obtain power saving effect compared with the current situation. In Act 35, if the reduced power amount ΔW does not exceed the target reduced power amount Wm, the desired power saving effect cannot be obtained with the simulation values. Therefore, if n minutes become equal to or greater than the current power saving transition time T11 (NO in Act 28) or if the reduced power amount ΔW does not exceed the target reduced power amount Wm (NO in Act 35), the processor 11 notifies that there is no recommended time (Act 50). For example, the processor 11 displays a message indicating that "the power saving transition recommended time and the sleep transition recommended time cannot be calculated" in the setting support screen SC3, and informs the user. Through the above, the processor 11 terminates the information processing according to the setting support program.

As described above, according to the setting support apparatus 1 of the present embodiment, the user can easily know the recommended value N1 of the power saving transition time and the recommended value N2 of the sleep transition time at which the ready mode operation ratio K1 and the power saving mode operation ratio K2 having the high convenience of the MFP 2 are obtained. Moreover, the recommended values N1 and N2 can realize the target reduced power amount. Therefore, by setting the recommended values N1 and N2 as the power saving transition time and the sleep transition time in the MFP 2 without any changes, it is possible to enhance the power saving effect without impairing the convenience of the MFP 2.

According to the setting support apparatus 1 of the present embodiment, only by inputting the change decision button of the setting support screen SC3, it is possible to set the recommended values N1 and N2 displayed on the screen SC3 as the power saving transition time and the sleep transition time in the MFP 2. Therefore, it is possible to easily set the appropriate power saving transition time and sleep transition time for the MFP 2.

In the above embodiment, it is investigated whether the reduced power amount exceeds the target value by executing the processing in Act 32 to Act 35; however, the processing in Act 32 to Act 35 may not be necessarily executed. In Act 30, if the cumulative ratio K is equal to or greater than the ready mode operation ratio K1, the processing proceeds to the processing in Act 36 and the value of the counter n may be stored in the main memory 12 as the power saving transition recommended time N1.

In the above embodiment, the simulation is executed by operating the setting support screen SC1 by the user. In another embodiment, the processor 11 automatically executes a simulation periodically based on the preset values (Wh, K1, K2). Then, if the recommended transition time to the power saving mode is output, the processor 11 may notify the user by e-mail or the like and urge to set to the recommended transition time to the power saving mode.

A modification of the embodiment is described below.

In the above embodiment, the setting support apparatus 1 of the MFP 2 in which the power saving mode is set to the power saving mode and the sleep mode is exemplified. The setting support apparatus 1 of the present embodiment can be applied by setting the sleep transition time to "0" to the job execution apparatus such as the printer, the scanner, etc. in which the power saving mode is set to one stage or three stages or more.

In the above embodiment, the setting support apparatus 1 for one MFP 2 connected to the LAN 3 is exemplified. By acquiring the log data of the job from two or more MFPs 2 connected to the LAN, the setting support apparatus 1 which supports setting of the common sleep transition time and power saving transition time in two or more MFPs 2 may be used.

In the above embodiment, the log data in a preset period among the log data of the job stored in the job database 231 is analyzed to calculate the number of jobs by the standby time. In this regard, the log data in a predetermined day of the week or a predetermined time band among the log data in a preset period may be analyzed to calculate the number of jobs by the standby time by day of the week or time band and to calculate the degree of the job executed till the standby time. The degree of the job is not limited to the cumulative ratio.

In the above embodiment, the display output module to the display device is exemplified as the output module. The output module is not limited to the display output module. For example, the information relating to the degree of the job or the information relating to the shortest time may be output by printing output or audio output.

In the above embodiment, a case where the setting support apparatus 1 is provided at outside of the job execution apparatus which is the support object is exemplified. The setting support apparatus 1 may be incorporated in the job execution apparatus internally to be a setting support apparatus 1 dedicated to the job execution apparatus.

The transfer of the setting support apparatus 1 is generally made in a state in which the program such as the setting support program is stored in the auxiliary storage device 13 or the main memory 12. However, the present invention is not limited to that, and the program may be transferred in a state in which the program is not stored in the ROM, or another control program is stored in the ROM or the auxiliary storage unit. In this case, the setting support program transferred separate from the setting support apparatus 1 may be written in response to an operation by the user in a rewritable storage device provided in the setting support apparatus 1 or may rewrite the above another control program. The transfer of the setting support program can be performed by recording the setting support program in a removable recording medium or through communication via the network. The recording medium may be in any form as long as it can store a program and can be read by the apparatus such as a CD-ROM, a memory card and the like. The function obtained by installing or downloading the program may be realized in cooperation with an OS (operating system) or the like inside the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A setting support apparatus, comprising:
    an arithmetic module configured to calculate a degree of a job executed until a standby time, the degree of the job executed being calculated based on a value obtained by totaling a number of times jobs executed by a job execution apparatus at each standby time after a previous job are terminated;
    an input reception module configured to receive input of a transition time to a power saving mode set in the job execution apparatus; and
    an output module configured to output information to the job execution apparatus relating to the degree of the job executed by the job execution apparatus until the transition time of which input is received by the input reception module based on a calculation result of the degree of the job by the arithmetic module, to control operation of the job execution apparatus,
    wherein the arithmetic module, the input reception module, and the output module comprise a processor.

2. The setting support apparatus according to claim 1, further comprising:
    a setting module, comprising the processor, configured to set the transition time of which the input is received by the input reception module in the job execution apparatus.

3. The setting support apparatus according to claim 2, further comprising:
    a reduced power amount calculation module, of the processor, configured to calculate a reduced power amount if the transition time of which the input is received by the input reception module is set in the job execution apparatus, wherein
    the output module is further configured to output the reduced power amount calculated by the reduced power amount calculation module.

4. The setting support apparatus according to claim 1, wherein the degree of the job executed is a cumulative ratio, which is a ratio of the number of jobs executed by a corresponding standby time to the total number of jobs executed.

5. A setting support apparatus, comprising:
    an arithmetic module, of a processor, configured to calculate a degree of a job executed until a standby time, the degree of the job executed being calculated based on a value obtained by totaling a number of times jobs executed by a job execution apparatus at each standby time after a previous job are terminated;

an input reception module configured to receive input of the degree of the job executed in a normal mode before switching to a power saving mode in the job execution apparatus;

a time acquisition module, of the processor, configured to acquire a shortest time of the standby time until a job having a degree equal to or greater than the degree of the job the input of which is received by the input reception module is executed in the job execution apparatus based on a calculation result of the arithmetic module; and an output module configured to output to the job execution apparatus the shortest time acquired by the time acquisition module to control operation of the job execution apparatus, wherein the arithmetic module, the input reception module, the time acquisition module, and the output module comprise a processor.

6. The setting support apparatus according to claim 5, further comprising:

a setting module, of the processor, configured to set the shortest time acquired by the time acquisition module in the job execution apparatus as a transition time to the power saving mode.

7. The setting support apparatus according to claim 5, wherein the degree of the job executed is a cumulative ratio, which is a ratio of the number of jobs executed by a corresponding standby time to the total number of jobs executed.

8. A setting support method, including:

calculating a degree of a job executed until a standby time based on a value obtained by totaling a number of times jobs executed by a job execution apparatus at each standby time after a previous job are terminated;

receiving input of a transition time to a power saving mode set in the job execution apparatus; and outputting information, via a output module of a processor, to the job execution apparatus relating to the degree of the job executed by the job execution apparatus until the transition time of which input is received based on a calculation result, to control operation of the job execution apparatus.

9. The setting support method according to claim 8, further comprising:

setting the transition time of which the input is received.

10. The setting support method according to claim 9, further comprising:

calculating a reduced power amount if the transition time of which the input is received; and outputting the calculated reduced power amount.

11. The setting support method according to claim 8, wherein the degree of the job executed is a cumulative ratio, which is a ratio of the number of jobs executed by a corresponding standby time to the total number of jobs executed.

* * * * *